(12) United States Patent
Suvitie

(10) Patent No.: US 11,861,398 B2
(45) Date of Patent: Jan. 2, 2024

(54) CONTROLLING DEVICES

(71) Applicant: NOKIA TECHNOLOGIES OY, Espoo (FI)

(72) Inventor: Arto Kristian Suvitie, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/562,413

(22) Filed: Dec. 27, 2021

(65) Prior Publication Data

US 2022/0121489 A1 Apr. 21, 2022

Related U.S. Application Data

(63) Continuation of application No. 16/787,485, filed on Feb. 11, 2020, now Pat. No. 11,210,137.

(30) Foreign Application Priority Data

Feb. 12, 2019 (EP) ..................... 19156671

(51) Int. Cl.
*G06F 9/54* (2006.01)
*G06F 9/48* (2006.01)
*G05D 1/00* (2006.01)
*G06F 9/38* (2018.01)

(52) U.S. Cl.
CPC ......... *G06F 9/4881* (2013.01); *G05D 1/0022* (2013.01); *G06F 9/3887* (2013.01); *G06F 9/542* (2013.01); *G06F 9/544* (2013.01); *G06F 9/546* (2013.01)

(58) Field of Classification Search
None
See application file for complete search history.

(56) References Cited

U.S. PATENT DOCUMENTS

| 6,654,647 | B1 | 11/2003 | Kal |
| 9,733,644 | B2 * | 8/2017 | Levien ................... G06Q 10/08 |
| 9,821,910 | B1 * | 11/2017 | Suiter ................ B64D 45/0059 |
| 10,034,319 | B2 * | 7/2018 | Hayes, Jr. ............. H04W 76/14 |
| 10,061,328 | B2 * | 8/2018 | Canoy ..................... G06V 20/13 |

(Continued)

FOREIGN PATENT DOCUMENTS

| CN | 105549613 A | 5/2016 |
| CN | 106448217 A | 2/2017 |

(Continued)

OTHER PUBLICATIONS

Domin, K., Security Analysis of the Drone Communication Protocol: Fuzzing the MAVLink Protocol, Thesis, Master of Science in Engineering, KU Leuven (2015-2016) 76 pages.

(Continued)

*Primary Examiner* — Michael Sun
(74) *Attorney, Agent, or Firm* — ALSTON & BIRD LLP

(57) ABSTRACT

Method and apparatuses for communicating instruction data items from a control apparatus to a device to be controlled are disclosed. The control apparatus receives a request for at least one instruction data item from a device and responds the request by sending a response message. The responding comprises selectively including at least one instruction data item in the response message based at least partly on determination whether the requested at least one data item has been sent before.

18 Claims, 9 Drawing Sheets

(56) References Cited

U.S. PATENT DOCUMENTS

| | | | |
|---|---|---|---|
| 10,518,877 B2 | 12/2019 | Levien et al. | |
| 10,586,464 B2* | 3/2020 | Dupray | G08G 5/0013 |
| 10,807,712 B2* | 10/2020 | Gandiga | G05D 1/0022 |
| 2015/0234387 A1 | 8/2015 | Mullan et al. | |
| 2018/0011484 A1* | 1/2018 | Wang | G05D 1/0022 |
| 2018/0307244 A1 | 10/2018 | Dierker et al. | |
| 2019/0227571 A1* | 7/2019 | Ito | G05D 1/0274 |

FOREIGN PATENT DOCUMENTS

| | | |
|---|---|---|
| CN | 108734336 A | 11/2018 |
| WO | WO 2018/021457 A1 | 2/2018 |

OTHER PUBLICATIONS

Extended European Search Report for Application No. 19156671.0 dated Oct. 25, 2019, 9 pages.
Kaugerand, J., Autonomous Unmanned Aerial System as a Component in a Tactical System of Systems, [online] [retrieved Dec. 28, 2018]. Retrieved via the Internet: https://webcache.googleusercontent.com/search?q=cache:zsVaeFOPCDUJ:https://digi.lib.ttu.ee/i/file.php%3FDLID%3D1579%26t%3D1+&cd=2 . . . (dated 2014) 74 pages.
Non-Final Office Action for U.S. Appl. No. 16/787,485 dated Apr. 15, 2021.
Notice of Allowance for U.S. Appl. No. 16/787,485 dated Aug. 18, 2021.
Office Action for European Application No. 19156671.0 dated Feb. 2, 2022, 5 pages.
Passthrough FrSky Telemetry Protocol (brochure) ArduPilot (2019) 3 pages.
SiK Radio—Advanced Configuration (Brochure) ArduPilot (2019) 16 pages.
Tosunoglu, S., Autopilot System and Ground Station Software for UAV's, Thesis, Department of Aeronautics and Astronautics, Istanbul Technical University (Jan. 2013) 81 pages.
Office Action for Chinese Application No. 202010089007.0 dated Feb. 28, 2023, 20 pages.

* cited by examiner

CONTROLLING DEVICES

CROSS-REFERENCE TO RELATED APPLICATIONS

This application is a continuation of U.S. application Ser. No. 16/787,485, filed Feb. 11, 2020, which claims priority to European Application No. 19156671.0, filed Feb. 12, 2019, the entire contents of which are incorporated herein by reference.

FIELD

The present disclosure relates to methods, apparatuses and computer program products for controlling devices and more particularly providing control instructions for remote devices.

BACKGROUND

A device can be controlled remotely by sending control instructions via a communication link. An example of remote control is control of unmanned device by a separate control apparatus. An unmanned device can be defined is a device that is not under direct control of a human operator. An example of unmanned devices are unmanned vehicles, such as aerial vehicles (e.g. unmanned aerial vehicles (UAVs)), land vehicles and watercraft. Non-limiting examples of land vehicles comprise moving vehicles such as automotive (e.g., driverless cars, vans, heavy good vehicles, motorcycles etc.), industrial automatic guided vehicles, farming, forestry, gardening, cleaning, clearing, and surveillance and/or local control equipment and so forth. Further non-limiting examples of unmanned devices comprise machines such as robots, manipulators and other machines that can operate without presence of a human operator. Other examples of a device comprise devices that can be at least controlled at least in part based on instructions communicated from a control apparatus via a data communications link.

A vehicle or other device can be configured to receive control instructions related to a task it is to perform. In this disclosure the term 'mission' is used for any task or operation, or a part of a task or operation to be performed by a device. A device may operate autonomously or semi-autonomously based on control instructions received from a control apparatus. Control instructions may need to be constantly provided during the mission to the device to enable it to operate in a desired manner and complete the mission. Ongoing delivery of control instructions may be needed, for example, to control movements of a moving device, respond to changes in operating conditions and/or plans and so forth. Control instructions may be constantly provided for an unmanned device, for example, via an appropriate data communication system. The data can be communicated over a wireless link.

Devices may be used to execute a variety of different tasks or missions. For example, unmanned vehicles may be deployed to collect data from a plurality of different areas, for search operations, to deliver and/or collect objects, to collect/stream image and video data as they move and/or their surroundings, to perform a maintenance operation and so on. A device can be configured to use real-time or almost real-time sensor data to achieve the set of objectives that are specified by the instructions for the task. The sensor data may be received from sensors located on an unmanned device, or from an external apparatus. Missions may be performed by an individual unmanned vehicle or another device, or by a collection of unmanned devices acting to achieve a common objective/mission. Performing a mission can become a complicated task and may comprise communication of substantial amounts of data and messages between the control apparatus to the unmanned device. This may cause latency and/or overhead issues.

SUMMARY

According to an aspect, there is provided a method of communicating instruction data items from a control apparatus, comprising receiving, by the control apparatus, a request for at least one instruction data item from a device, and responding, by the control apparatus, the request by sending a response message, the responding comprising selectively including at least one instruction data item in the response message based at least partly on determination whether the requested at least one data item has been sent before.

According to another aspect there is provided a control apparatus configured to receive a request for at least one instruction data item from a device and send a response message to the request, the sending comprising selectively including at least one instruction data item in the response message based at least partly on determination whether the requested at least one data item has been sent before.

According to an aspect there is provided a method of obtaining instruction data items at a device, the method comprising sending from the device to a control apparatus a request for at least one instruction data item, receiving, by the device from the control apparatus, a response message to the request comprising one or more instruction data items, wherein the number of instruction data items has been selected based at least partly on determination whether the requested at least one data item has been sent before to the device, and controlling operation of the device based on the received at one or more instruction data item in the response message.

According to an aspect there is provided a control apparatus for a device, configured to send to a remote control apparatus a request for at least one instruction data item, receive, from the remote control apparatus, a response message comprising one or more instruction data items, wherein the number of the instruction data items has been selected based at least partly on determination whether the requested at least one data item has been sent before to the device, and control operation of the device based on the received one or more instruction data items in the response message.

According to a more detailed aspect the control apparatus can selectively include, in response to a request for a single instruction data item, either a single instruction data item or multiple instruction data items in the response message.

According to another more detailed aspect the control apparatus can dynamically adjust the number of instruction data items in the response message.

According to another more detailed aspect the control apparatus can include in the response message at least one instruction data item that was not requested by the request.

According to another more detailed aspect the control apparatus can respond the request by including multiple instruction data items in the response message. The number of instruction data items included in the response message can be greater than the number of data items indicated by the request.

According to another more detailed aspect the control apparatus can include a single instruction data item in the response message in response to determining that the request concerns an instruction data item that has already been sent to the device. Multiple instruction data items can be included in the response message in response to determining that the request concerns an instruction data item that has not yet been sent to the device.

The response message may comprise at least one instruction data item that was not requested by the request.

According to an aspect a first response message communicated from the control apparatus to the device includes multiple instruction data items. An instruction data item of the received multiple instruction data items is used for control of the device and the other instruction data items of the multiple instruction data items are saved in a memory of the device. In response to a failure to obtain one of the saved instruction data items from the memory, a second request is sent for said non-obtained instruction data item. A second response message including at least one instruction data item is received in response, the at least one instruction data item being different from the instruction data item requested by the second request. Operation of the device can then be continued based on the received at least one instruction data item.

The device may comprise an unmanned aerial vehicle. The device may comprise an unmanned land vehicle. The device may comprise an unmanned watercraft. The device may comprise an unmanned control apparatus. The device may comprise an unmanned machine. The device may comprise a device operated in an Internet of things environment.

The control apparatus and the device may be configured to process the requests and responses based on Mavlink protocol. User datagram protocol may be used for the messages.

A control apparatus can be configured to determine how to respond to a request for at least one instruction data item from a device. The control apparatus can decide to selectively respond by a message carrying one mission data item or a message carrying multiple mission data items. The control apparatus can also determine how many data items shall be included in the response message.

A determination can be made whether or not one or more of the requested instruction data items has already been delivered. If the item has not been sent yet, this information can be considered to imply that the request is made because a buffer at the controlled device is empty. The control apparatus can send a response message carrying the next multiple data items. It can also be determined that the requested item has already been sent to the device. A determination can then be made that it is probable that the buffer at the device is not empty. Such determination can be made based on assumption that because of the previous sending of the data items there still are some items left in the buffer. To avoid risk of a buffer overflow a response message with one instruction data item, or only a few items, is sent.

A control station for controlling an unmanned device may be provided. The control station can comprise a control apparatus as describe herein. A control station may comprise a ground control station. A control station may comprise a mobile communication device.

A system for controlling unmanned devices comprising a control apparatus and/or a control station as described herein may also be provided.

A computer software product embodying at least a part of the herein described functions may also be provided.

BRIEF DESCRIPTION OF DRAWINGS

Some aspects will now be described in further detail, by way of example only, with reference to the following examples and accompanying drawings, in which.

DETAILED DESCRIPTION OF EXAMPLES

In general, the following detailed description is given first with reference to task, also referred to as missions, performed by movable vehicles based on instruction data items received from a remote control apparatus. It is, however, noted that although some of the examples are given in the context of unmanned vehicle, or autonomous vehicles, a device controlled based on the principles disclosed herein can be any machine or another apparatus that can perform a task without direct human operator control based on instruction data items received from control apparatus in response to a request for instructions. For example, an unmanned device may comprise a robot, another manipulator, a surveillance device and so forth.

Figure 1:
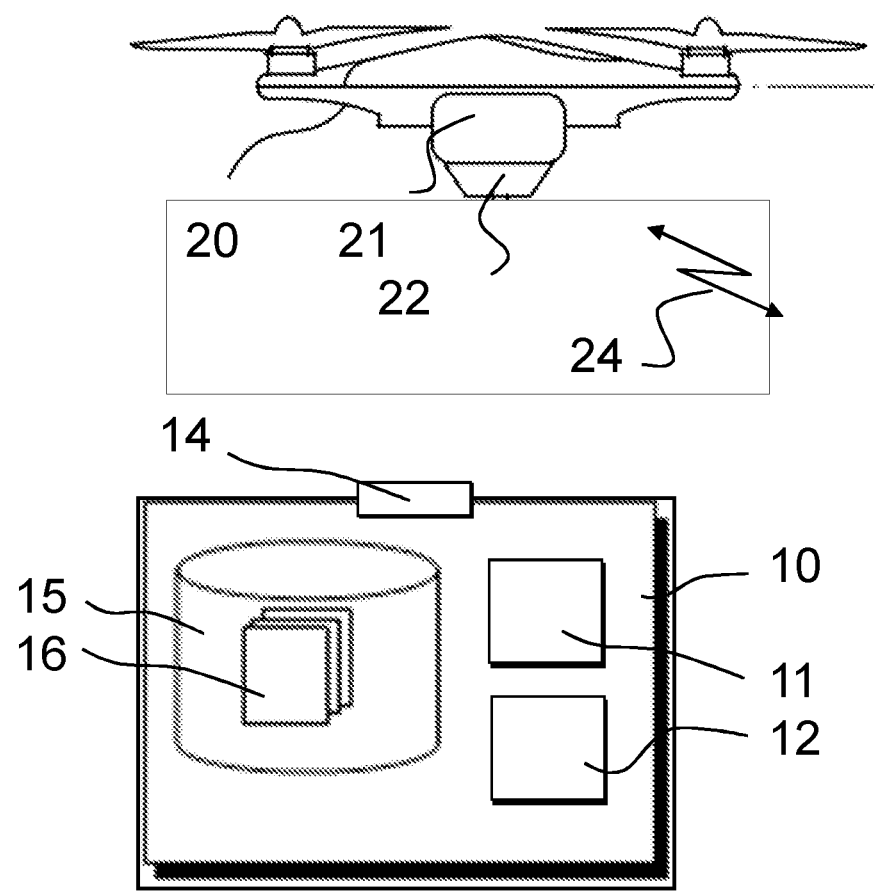
FIG. 1 illustrates an example of a control apparatus and an unmanned device controlled by the control apparatus.

FIG. 1 shows a control apparatus 10 configured for remotely controlling an unmanned device. In the example such device comprises an unmanned aerial vehicle (UAV) 20. In the case of UAVs, the control apparatus may be provided, for example, by a ground control station (GCS) configured to provide control instruction for and communicate with at least one unmanned aerial vehicle. Unmanned aerial vehicles are often called "drones".

The control apparatus 10 can comprise at least one processor 11, 12 and at least one memory 15. The at least one memory 15 comprises computer code that, when executed on the at least one processor, causes the apparatus to perform at least one of the herein described functions. The control apparatus 10 can be configured to communicate via appropriate data communication system using appropriate one or more communication protocols. The communications may be via local networks, wide area networks or even direct communications between the control station and the unmanned device. For example, communication may be based on $4^{th}$ or $5^{th}$ generation (4G, 5G) communication systems and protocols, or later developments of the currently envisaged communication systems. The communications may be carried at least in part on wireless links 24. The protocols may be based an appropriate connectionless protocol. What is needed for the purposes of the herein escribed examples is that the remote control station 10 is capable of receiving messages from and sending messages to an on-board data processing apparatus of the unmanned vehicle 20. Thus the control apparatus comprises data communications circuitry, denoted by reference 14, for receiving and transmitting data. It is understood that although the receiving circuitry and transmitting circuitry and various possible components thereof are shown as one block, the circuitry can comprise a number of circuitries. Such circuitries may share at least some components between them.

Instruction data items 16 are shown to be available at the at least one memory 15. The instruction data items can comprise control instructions such as information about next location coordinates, e.g., in longitude and latitude, altitude, speed, acceleration, breaking, distance, and so on. Control instruction items for a path of travel are often called waypoints. Examples for communications of the data items 16 to the unmanned device 20 will described below.

The unmanned vehicle 20 is configured to receive control information in the form of the data items 16 from the control station 10. The unmanned aerial device apparatus of the example of FIG. 1 comprises appropriate on-board data processing apparatus that can be located within the body 21 thereof and adapted for processing instructions form the control stations 10 and controlling operation of the unmanned device 20 accordingly. An example of the data processing apparatus will be described with reference to FIG. 2.

The UAV apparatus 20 further comprises an energy source 22. The energy source may be embodied in a variety of different ways. For example, the apparatus may be powered by electrical energy or by a chemical fuel. Electrical energy may be stored in an energy storage arrangement, such as for example a battery or ultracapacitor. The apparatus may also be arranged to receive electrical power via a cable while in active operation/whilst executing a mission, providing effectively unlimited flying time but with range limited by the length of the cable. The energy source may also be provided by photovoltaic cells which power, in part or in full from light. Chemical fuel may be stored in the apparatus in a tank or other kind of suitable arrangement. Chemical fuel may comprise, for example, hydrogen for generating electrical energy on board in a fuel cell, or a combustible hydrocarbon fuel for combustion in a generator to generate electricity, and/or an engine to power the apparatus directly.

Figure 2:
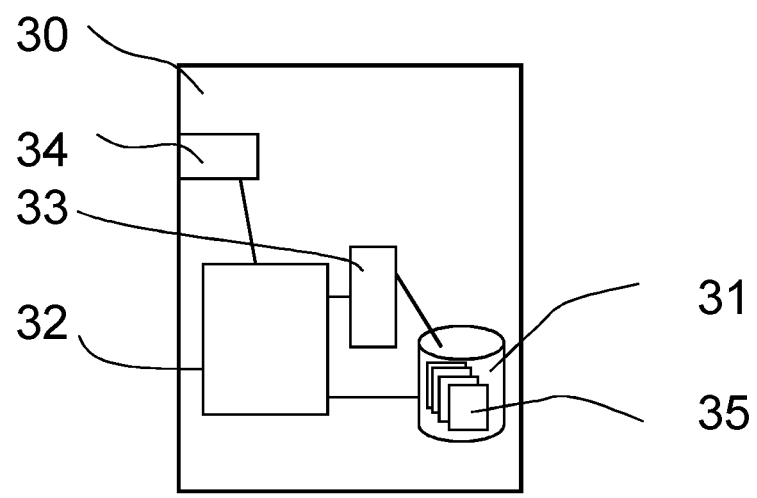
FIG. 2 shows an example of control apparatus for an unmanned device.

FIG. 2 shows an example of control apparatus 30 that may execute any of the herein described operations at an unmanned device. The apparatus 30 comprises at least one processor 32, 33 and at least one memory 31. The at least one memory comprises computer code that, when executed on the at least one processor, causes the apparatus to perform at least one of the herein described operations. The apparatus further comprises communications interface 34. The interface provides appropriate circuitry to enable receiving and transmitting of data by the control apparatus.

The memory 31 can provide a data buffering function for received instruction data items 35. The at least one data processor can read the data items 35 from the buffer and cause performance of operations relating to the task to be performed accordingly. The instruction data items 35 can be read in sequential order until the buffer is empty. The on-board data processing apparatus of the unmanned vehicle can generate autopilot-specific instructions from the received commands.

The control station 10 may receive telemetry information from unmanned vehicles under its control. For example, an unmanned vehicle may be configured to transmit mission progress information (e.g. information about the current waypoint and remaining distance, about near-by objects, other moving vehicles, other moving vehicles in a swarm of vehicles, sensor data from other devices and so on) to the ground control station. Information about the operating condition and/or state of the device may also be provided. For example, information about the remaining energy levels may be communicated back to the control station. The control station can then take the received information into account in the control actions, including in decision making regarding what to include in response messages.

In accordance with a non-limiting example mission control information may be transmitted as Micro Air Vehicle Link (MAVLink) commands. MAVLink is an open source, point-to-point communication protocol used between a ground control station and unmanned vehicles to carry telemetry and to command and control unmanned vehicles. It may be used to transmit the orientation of an unmanned vehicle, its GPS location and speed. The current form of the MAVLink message has a maximum length of 17 bytes, consisting of a 6 bytes header, 9 bytes payload and 2 bytes checksum (acknowledgments do not comprise a payload and thus have the minimum size of 8 bytes). The exact form of the MAVLink protocol is not static, and may evolve/change over time. The MAVLink protocol operates at the application layer. It is noted that MAVLink is only given herein as an illustrative example of a protocol operating at this level for this purpose, and other protocols and message sizes may be used instead of this.

Messages for an unmanned vehicle are traditionally sent using separate packets. For the exemplifying MAVLink protocol, the following are examples of messages that may be communicated for a mission comprising N waypoints. A control station first sends to an unmanned vehicle a MISSION_COUNT message that can contain the amount of mission items for a mission. The control station then sends a MISSION_ITEM message that contains coordinates and parameters for a first waypoint. The control station then sends a MISSION_ITEM message that contains coordinates and parameters for a second waypoint, and so forth. Finally, the control station sends a last MISSION_ITEM message that contains coordinates and parameters for the Nth waypoint. After this the control station can send to the unmanned vehicle a MISSION_ACK message that indicates that the last waypoint has been transmitted. The unmanned vehicle responds with an acknowledgement of all of these messages.

The inventor has realised that certain aspects of the communications may be improved by a mechanism where several of the messages for a mission each providing an instruction data item are included into a single response message for transmission to the unmanned device. This can allow for a faster information transfer and thus reduced latency because the needed data item is already available in the vehicle, mobile or another device. This can also be used to save processing energy at the device. This may be of particular importance in battery operated devices such as drones as other moving vehicles. Lower signalling-to-payload overhead may also be achieved. To this effect, the following describes several aspects, which may be implemented in isolation or in combination with each other, for achieving at least some of these and possible other advantages.

Figure 3:
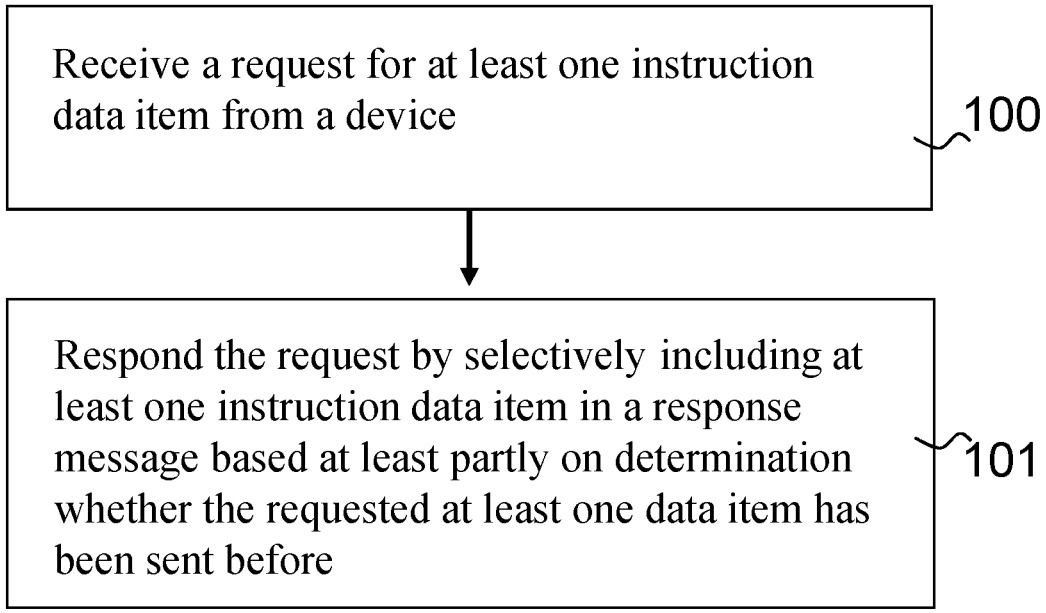
FIGS. 3 and 4 are flowcharts for operation of a remote control apparatus according to some examples.

FIG. 3 shows an example of a method of communicating instruction data items from a control apparatus to a device, for example an unmanned device. In the method the control apparatus receives at 100 a request for at least one instruction data item from the device. The control apparatus responds to the request at 101 by including a selected number of instruction data items in a response message. The number of items to be included in the response message can be selected based on knowledge whether the requested at least one data item has already been sent to the device or not.

In accordance with a possibility one or more instruction data items are communicated from a control station after receiving a request for an instruction data item from a vehicle or a mobile. The request is responded by selectively including one instruction data item or more than one instruction data items in a response message to the request for an instruction data item.

The responding can comprise selectively including at least one instruction data item in the response message based at least partly on determination that the requested at least one data item has been sent before. The included at least one data item can be different than any of the requested one or more data items.

Figure 4:
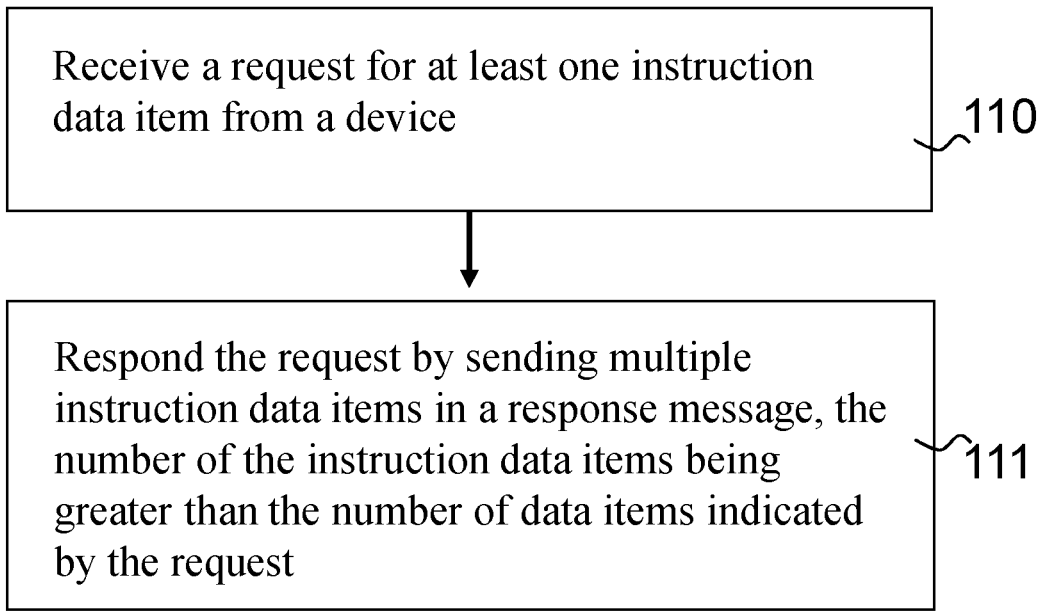

FIG. 4 shows a flowchart for operation where, after reception of the request at 110, multiple data items are included in the response message at 111 such that the number of instruction data items in the response message is greater than the number of data items indicated by the request. According to an aspect, the requested at least one data item is not included amongst the multiple data items in the response message.

According to a possibility a single instruction data item or multiple instruction data items is selectively included in a response message to a request for a single instruction data item. A single instruction data item may be included in the response message in response to determining that the request concerns an instruction data item that has already been sent to the unmanned device. The single data item included can be different from the requested data item. Multiple instruction data items may be included in the response message in response to determining that the request concerns an instruction data item that has not yet been sent to the unmanned device.

It is also possible for the control apparatus to dynamically adjust the number of instructions data items in a response message. The adjustment can take into account whether the requested data items has already been transferred and other factors, for example status information from the controlled unmanned device.

A command can be included as a single instruction data item or it can be included in a multiple instruction data items. A further command for stopping the task may comprise two or more identical instruction data items. This may be desired, for example, if some reason the first command of stopping is not effective, for example.

Some of the commands can be short and/or require urgent attention (such as a command for stopping the unmanned vehicle) and so should be sent as soon as possible. Other commands may be much longer in form, such as detailing a plurality of waypoint locations for a mission. The urgency can be taken into account as a part of the decision making process when decision what to include in a response message.

Figure 5:
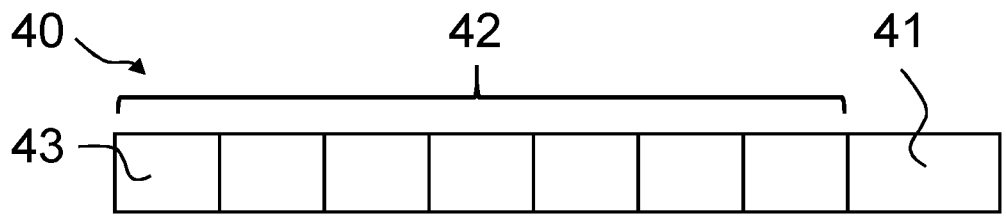
FIG. 5 is an example of a response message.

FIG. 5 shows an example of a response message 40. The message is provided by a data packet comprising a header part 41 and payload part 42. The header part can be arranged according to the protocol used for the communications. The payload part 42 comprises multiple of data items 43. In the example of FIG. 5 the payload is shown to carry nine data items but this can be any number accommodated by the protocol. The number of data items can also be changed during the mission. The transmission of the message 40 may be via an Internet Protocol (IP) mechanism. The transport protocol may be a connectionless protocol, such as user datagram packet (UDP) protocol or another suitable protocol. What is relevant is that the control apparatus can selectively include more than one instruction data item in the payload is response to determination that is based at least in part on a received request how many instruction data items shall be sent in the response message to the requesting unmanned device. In accordance with a possibility priority information is included in the packet.

Figure 6:
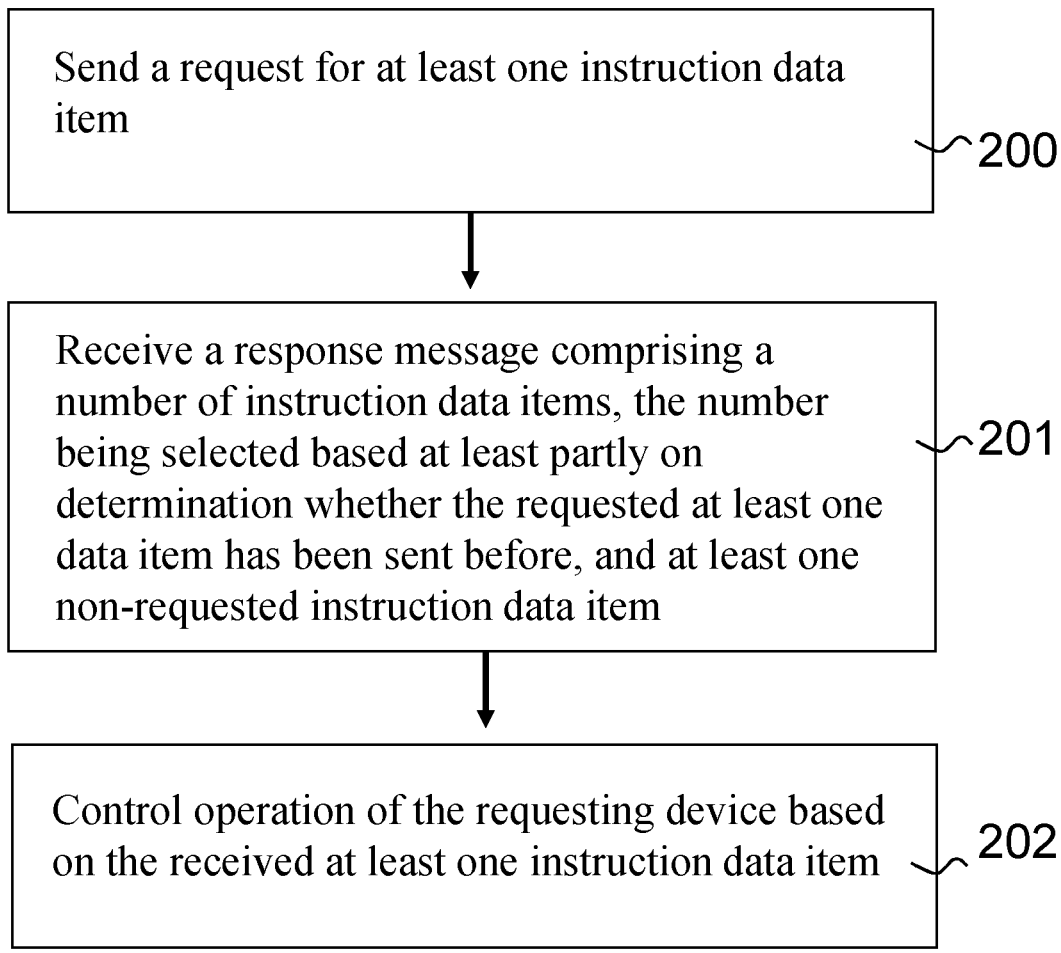
FIGS. 6 and 7 are flowcharts for operation at an unmanned device according to some examples.

FIG. 6 shows an example of operation at an unmanned device. At 200 the unmanned device can send to a control apparatus a request for at least one instruction data item. The unmanned device then received at 201 from the control apparatus a response message to the request. The response message comprises a number of instruction data items, the number having been selected based at least partly on determination whether the requested at least one data item has been sent before to the unmanned device.

According a possibility the response message comprises at least one instruction data item that was not requested by the request.

Operation of the unmanned device can then be controlled at 203 based on the received at least one instruction data item in the response message.

Figure 7:
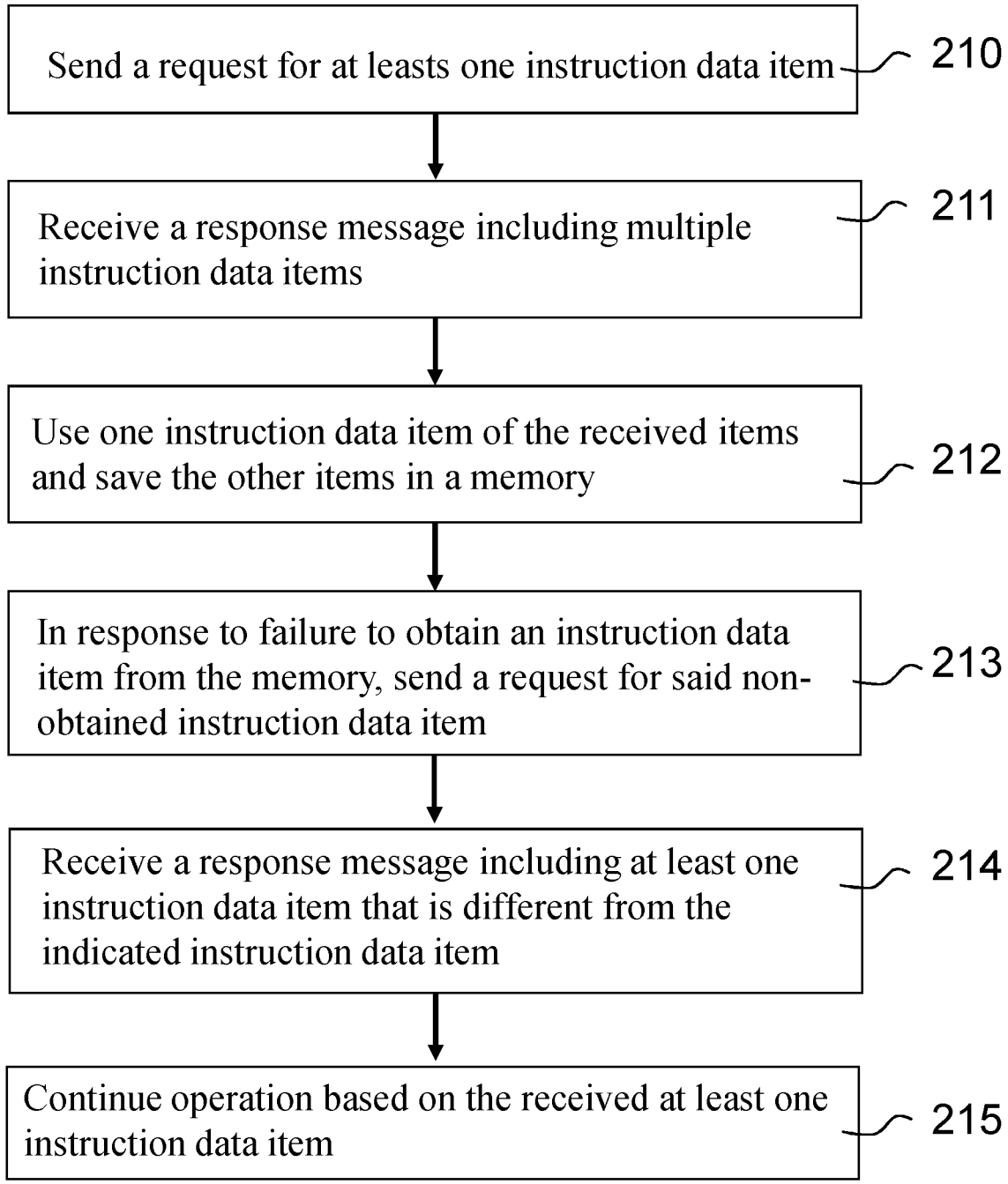

FIG. 7 shows another example for operation at an unmanned device. A first response message to a request send at 210 can be received at 211 from a remote control apparatus, the first response message including multiple instruction data items. An instruction data item of the received multiple instruction data items is then used at 212 for control of the unmanned device while the other instruction data items can be saved in a memory of the unmanned device.

In case of a failure to obtain one of the saved instruction data items from the memory, a second request for said non-obtained instruction data item is sent at 213. A second response message is received at 214. The second response message can include at least one instruction data item, the at least one instruction data item being different from the instruction data item requested by the second request. The operation of the unmanned device is then continued at 215 based on the at least one instruction data item received in the second response message.

The unmanned device may be arranged to transmit a plurality of acknowledgements, each acknowledgement corresponding to a respective one of the plurality of mission items. Thus, on receipt of a message comprising multiple data items, the unmanned device may be arranged to provide acknowledgments for each of the item. Each of the acknowledgements by the unmanned vehicle for each of the items may be transmitted separately to each other. Alternatively, a message with multiple data items can be acknowledged by a single acknowledgement message, or acknowledgements of multiple individual data items can be bundled into an acknowledgement message.

An acknowledgement message may also include status information (e.g., rendered, not rendered) of the instruction data item and/or whether the waypoint of the instruction data item is reached by the vehicle. The acknowledgement message may also comprise the respective identification of instruction data items as used in the response message.

The control station may be configured to wait between transmissions of messages with multiple data items. This can be provided in order to enable the unmanned device to receive and process the multiple packets in orderly fashion.

The following describes certain more detailed examples. The examples illustrate principles that can be applied to any unmanned vehicle. For the purposes of illustration, in some of the examples the device is specified to comprise an unmanned aerial device (UAV). Control apparatus adapted for selective sending of data items in response messages to requests is occasionally referred to as a ground control station (GCS). The apparatus of the unmanned device for controlling operations at the device end is referred to as an autopilot. Instruction data items are referred to as mission items.

A ground control station (GCS) application, e.g., in one or more nests or centrally in a cloud can be used to control drones over a Long-Term Evolution (LTE) network or any other cellular network, new radio (NR, 5G) for example. Both the drone and the GCS may have radio modem to control the drones. A drone may have an on-board computer associated with autopilot for example. Relevant user equipment (UEs) can be provided by a ground station laptop and the drones themselves connected to at least one base station. An LTE modem with a registered subscriber identity module (SIM) may be required to enable a laptop or a drone to connect to an LTE network. The modems can often be connected to antennas for improved range.

The E-UTRAN, as the name implies, forms the access network, which comprises of multiple evolved base stations called eNodeB (eNB) or (e/g)NodeB. These base stations serve one or more cells, which the UEs can connect to. The main task of the eNB is to handle the communications between the UEs and an evolved packet core (EPC). In addition to being connected to UEs and the EPC, each eNB is also connected to its nearby peers for the purpose of signalling and handover packet forwarding. Each UE and drone can belong to only one cell and communicate with only one eNB at a time. A handover can be performed whenever the UE moves to a new cell.

The EPC forms the core network and it can contain entities such as a Home Subscriber Server (HSS), a Packet Data Network Gateway (PGW), a Serving Gateway (SGW) and a Mobility Management Entity (MME). The HSS is a central database for information related to users and subscriptions. It is queried by the MME, which is responsible for control plane operations and UE authentication. Each UE is assigned their own SGW, which handles the routing, forwarding and buffering of packets. PGW on the other hand handles IP address allocation for UEs and does all IP packet operations required for the connections towards a Packet Data Network (PDN).

One of the advantages of the cellular technology like LTE or 5G is the capability to use spatial multiplexing with Multiple Input Multiple Output (MIMO) technique. This means that both the sender and receiver use multiple antennas simultaneously to transfer multiple data streams, increasing the bandwidth of the link and latency is decreased, and yet more in 5G.

5G is expected to have multiple radio interfaces, namely below 6 GHz, cmWave and mmWave. It is also expected that 5G can be integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. Low latency applications and services in 5G may require bringing of the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (e.g., autonomous vehicles, traffic safety, real-time analytics, time-critical control, healthcare applications).

Drones and other remotely controlled vehicles are traditionally controlled through a direct radio link, where both the drone itself and the ground station or handheld controller are equipped with radio transceivers and antennas. In this case, the vehicle must stay within range of the control station and within line of sight, or risk losing the connection. On the other hand, if an existing LTE network is used, then the vehicle can freely move wherever there is network coverage. This also means that the control software may be physically in a different location.

Teleoperation refers to the traditional low-level control method where the drone is controlled with a radio controller or joysticks that allow manoeuvring. An alternative real-time control method is guided waypoints or corridors. With this method, instead of controlling the drone directly, the user specifies a location to which the drone or other vehicle will directly attempt to move to. Typically, this is implemented as a map application on a ground station application, where the user may click to set the current target waypoint and destination for a drone.

Autonomous control can be considered a more sophisticated control method, which differs from direct teleoperation by having a device capable of performing operations even when communications are lost for a period of time. In its simplest form, autonomous control can be implemented as a list of mission or corridor items that the UAV or another vehicle can carry out in sequence.

Communications can also go other way. For example, an UAV may send during flight a continuous stream of telemetry reports back to a ground station. These reports contain information about the location and status of the UAV, as well as acknowledgements for commands and updates for current mission status as well battery charge and error status, for example.

Figure 8:
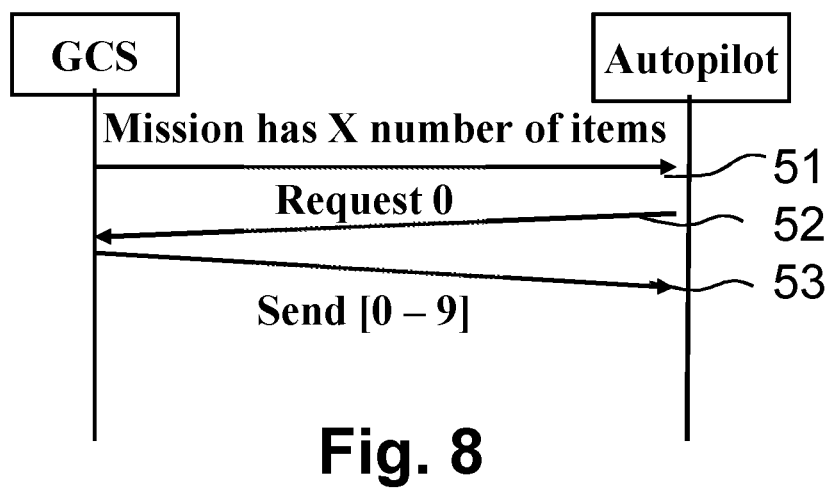
FIG. 8 is a signalling flowchart of an example.

According to an example shown in the signalling flowchart of FIG. 8 a ground control station (GCS) starts a mission operation by sending a message 50 informing an autopilot on-board of a vehicle of the number of mission data items of the mission. The ground control station then receives a request 51 for a first mission item from the autopilot. The ground control station can then, instead of responding with the requested first mission item, send in response message 52 several mission items packaged into one response message.

When generating the response message the ground control station included a greater number of mission items in the response message than was requested, the message including at least one data item that was not requested.

The autopilot may substantially immediately request the next mission data item after receiving a mission data item. On the other hand, the ground control station can predict mission data items that it would need to send in the foreseeable future. Therefore it is possible for the ground station control apparatus to send several mission data items at once in a response message instead of waiting and sending the data items one by one in response to requests for subsequent items.

The autopilot can store the received mission data items in a buffer, read the mission data items directly from the buffer without needing to request for them individually, and wait for the response messages. The autopilot can use the saved mission data items from the buffer in the sequential order.

According to a possibility the autopilot can continue fetching the instruction/mission data items from the buffer as long as there are mission items available, and request for a new one once there no items left to read, or it fails for some other reason to obtain a next item from the buffer. According to another possible way of operation the autopilot sends a new request after each mission data item it has processed. When the GCS receives a request it can respond by sending one or more mission data items in a response message, and ignore requests coming while responding to said request.

If the next mission data item is available in the buffer then there is no need to request it from the remote control apparatus, and wait for the requested data item to arrive in a response message. This can reduce latency and signalling overhead in obtaining the mission items.

In the example of FIG. 8 ten mission items, items 0-9, are shown to be send in the response message 52. However, the number of mission items in a response message can be set differently, and be any appropriate integer that a protocol message can carry. For example, 2, 5, 9, 10, 20, 25 instruction data items may be included in a response message. The number of items may be determined based on, for example, information such as whether the requested item has already been transmitted, the state of energy level at the unmanned device, processing and/or memory capacity and/or state of the unmanned device, operating conditions of the unmanned device and so forth.

Sending too many mission items at a time, for example about more than thirty, may cause in certain circumstances the autopilot to fail in reading correctly the mission items. A possible cause for this is that the buffer may become full and/or data items are lost because the autopilot receives data items faster than it can parse them. A solution to address this while maintaining the multiple data item per message transmission capability is to selectively change between sending single item and multi-item response messages to requests.

As mentioned above, the number of data items per a response message can also be selectively adjusted. That is, a response message can contain, e.g., four data items and a subsequent response message, e.g., six items. According to a possibility the number of mission data items may be dynamically changed during an operation. The change can be made, e.g., in response to changed conditions, changes in the mission, changes in connection quality, battery state, memory state, and so on. The control apparatus can be configured to be self-learning in this regard. For example, if the control apparatus determines that there is a risk of buffer overflow with the currently set number of mission items per message, e.g. based on noting reception of repeated requests for items that have already been sent exceeding a threshold, the number of mission items per response message can be reduced, for example halved.

Figure 9:
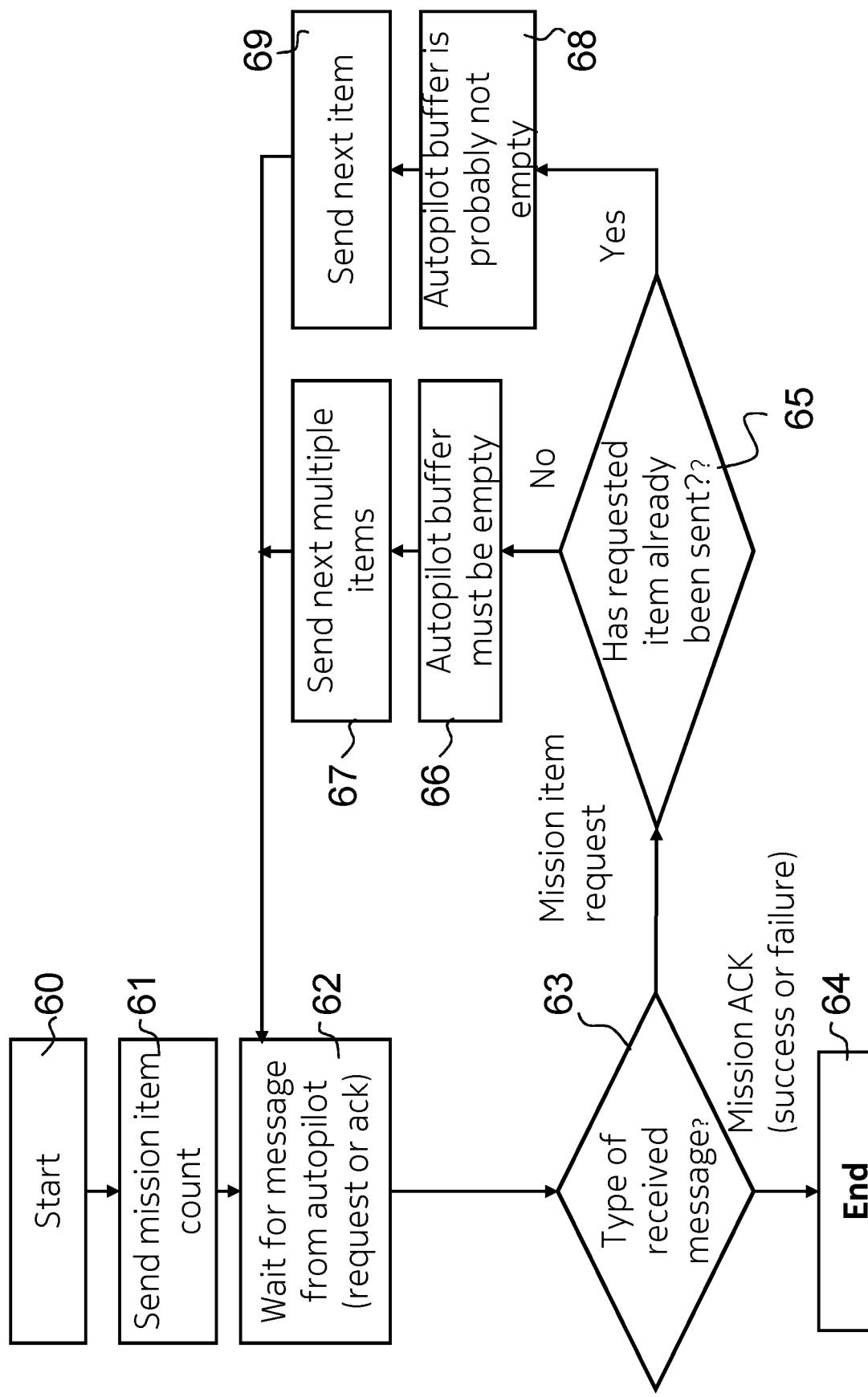
FIG. 9 is a flowchart of actions performed by control apparatus according to an example.
Figure 10:
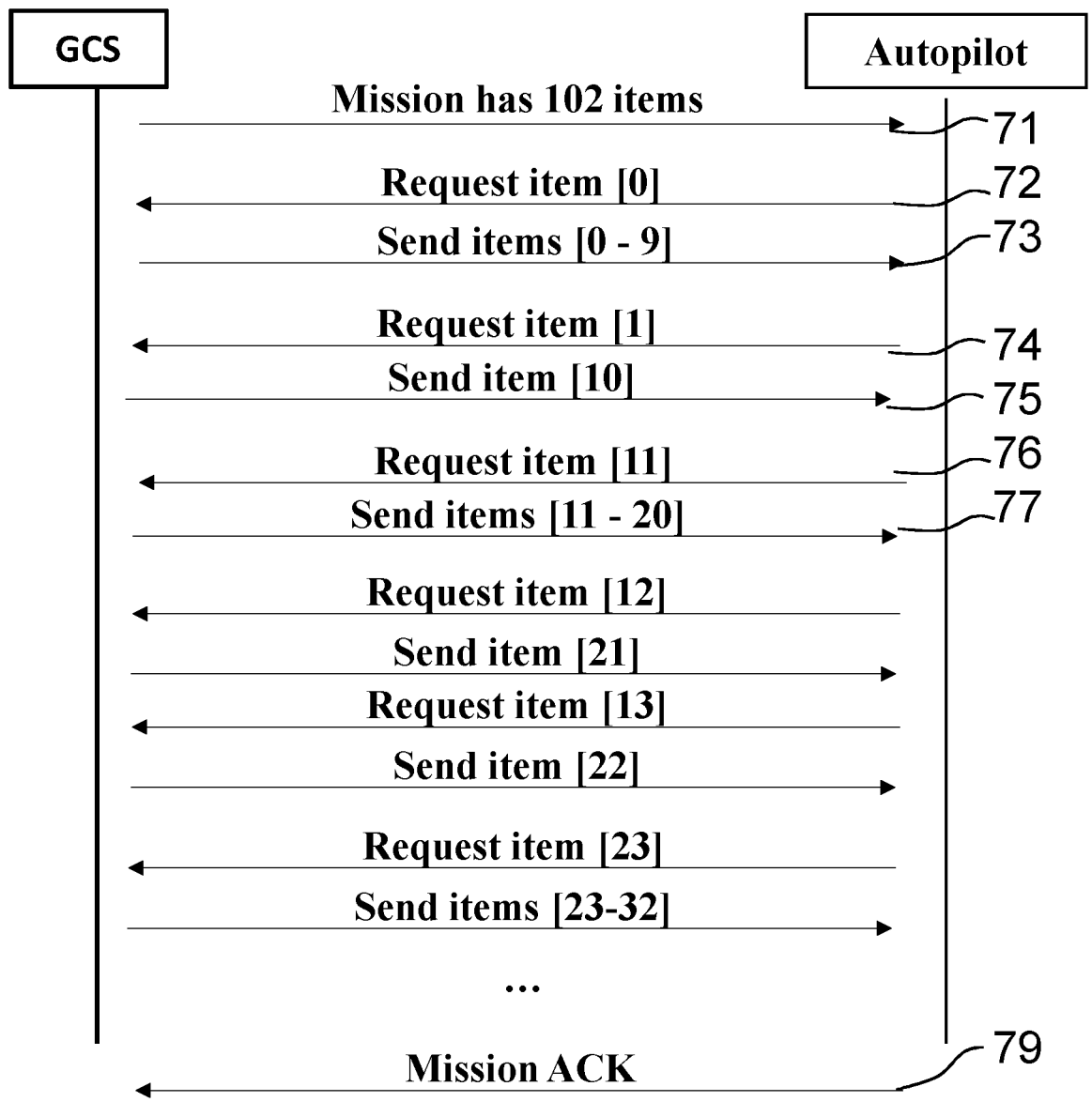
FIG. 10 is a signalling flowchart for the example of FIG. 9.

The flowchart of FIG. 9 and signalling flowchart of FIG. 10 show an example where a ground control station (GCS) selectively switches between two different states of sending data items, i.e. between sending of response messages containing multiple data items and response messages containing a single data item. The state can depend on determination how the requests are sent and/or received from the unmanned device.

In the example, if an autopilot at an unmanned device requests a mission item that has not been sent before, the ground control station sends the next multiple items (in the example ten items) to the autopilot. Otherwise the ground control station can assume that the unmanned device still has items waiting in the buffer, and the ground control station responds by sending one data item to avoid buffer overflow issues and to allow the autopilot to catch up.

More particularly, after start of the operation at 60, the ground control station can start mission upload by sending the number of mission items to the autopilot at 61. In this example a message 71 is sent indicating that the mission comprises 102 items. The ground control station can then wait at 62 for a message (a request or an acknowledgement) from the autopilot. The autopilot sends a message 72 requesting for the first mission item [0]. The ground control station receives the message and determines at 63 the type of the message.

The message can be determined to be either a request or an acknowledgement. If the message is acknowledgement (success or failure), the operation ends at 64. Any appropriate feedback mechanisms can be used for this purpose. Autopilot can send mission acknowledgement messages (ACK) to acknowledge that mission has been successfully received, or that upload has failed (NACK). The ground control station can assume that all mission data items in positively acknowledged messages have been received and are correctly stored in the buffer by the autopilot. If the acknowledgement indicates a failure in the message delivery, the message, and all mission items therein, is resent.

In FIG. 10 the ground control station responds to the first request 72 by sending the next ten items [0-9] in response message 73. The instruction data items are stored in the buffer by the autopilot for use in control the operation of the unmanned device.

However, as also shown in FIG. 10, the autopilot can send a second request 74 for data item [1]. That is, rather than using data item [1] from the buffer, the autopilot sends request message 74 for item [1] as a missing item. In this example the missing item [1] has already been sent by the ground control station in message 73, and can thus be assumed as being received. It the operation that follows, this triggers a determination of how many mission items can be included in the response message, an example of which is described in more detail below.

Turning back to FIG. 9, if a received message is determined at 63 by the ground control station to be a request message for a mission data item, the ground control station can then perform the determination at 65 whether to respond to the request by a message carrying one mission data item or a message carrying multiple mission data items. A determination can be made whether or not the requested item has yet been sent. If the item has not been sent yet, this information can be considered to imply that the request is made by the autopilot because the buffer thereof is empty. Such determination can be made at 66. The ground control station can then send at 67 a message carrying the next multiple data items. In FIG. 10 this corresponds to, e.g., message 72 including the first ten items [0-9] sent in response message 62 requesting for item [0]. The first of the items [0] can be used first by the autopilot and the upcoming nine items [1-9] are stored in the buffer. Thus the next data items are already available in the buffer for use by the autopilot. A second message 77 carrying multiple items [11-20] can be sent in response to request 76 requesting for item [11], and so forth. In other words, multi-item messages 73 and 77 are sent in response to determining that items [0] and [11] had not been previously requested and successfully sent.

It is also possible to determine at block 65 of FIG. 9 that the requested item has already been sent. A feedback mechanism can have confirmed that the message delivering the item had been received by the autopilot. FIG. 10 shows request 74 as an example of such situation.

A determination can now be made at block 68 of FIG. 9 that it is probable that the autopilot buffer is not yet empty. Such determination can be made based on assumption that because of the previous sending of message 73 the autopilot still has some items left in the buffer to read. This assumption can take into account the time that it would take to process the data items in the buffer. Sending next ten items in such case could risk overflowing the buffer and failing the upload. Therefore just one instruction data item may be sent at 69. An example of such message is denoted in FIG. 10 by message 75 including one data item [10].

In more general terms, and in examples not limited to autopilots and ground control stations, a control apparatus can determine at 65 how to respond to a request from a device. The control apparatus can decide to selectively respond by a message carrying one mission data item or a message carrying multiple mission data items. The control apparatus can also determine how many data items shall be included in the response message.

A determination can be made at 65 whether or not the requested data item has already been sent. If the item has not been sent yet, this information can be considered to imply that the request is made because the buffer at the controlled device thereof is empty. Such determination can be made at 66. The control apparatus can then send at 67 a response message carrying the next multiple data items.

It is also possible to determine at block 65 of FIG. 9 that the requested data item has already been sent to the device. A feedback mechanism may be provided that may have confirmed that the message delivering the data item had been received by the device. A determination can then be made at block 68 that it is probable that the buffer at the device is not empty yet. Such determination can be made based on assumption that because of the previous sending of the data items there still are some items left in the buffer, for example based on assumption that the time that it would take to process the data items in the buffer has not run out yet. Sending multiple data items in such case could risk overflowing the buffer and failing the upload. To avoid this a response message with one instruction data item is sent at 69.

After the decision to send a message with either multiple mission items, or just one mission item the operation returns to 62 where the control station waits for next message to arrive from the device to be controlled, for example unmanned vehicle.

It is noted that it does not matter which one of items [1] to [9] of message 73 is requested by request 74. The example operation would work in the same manner, and the response message 75 would include mission item [10] regardless of which item has been requested. FIG. 10 shows several rounds of requests and responses according to the above described process which is repeated until the autopilot sends mission ACK message 79. The ACK message can be used to either acknowledge that the complete mission has been successfully received, or that the upload has failed (NACK). A new mission can then be started, or the failed mission operation restarted.

Figure 11:
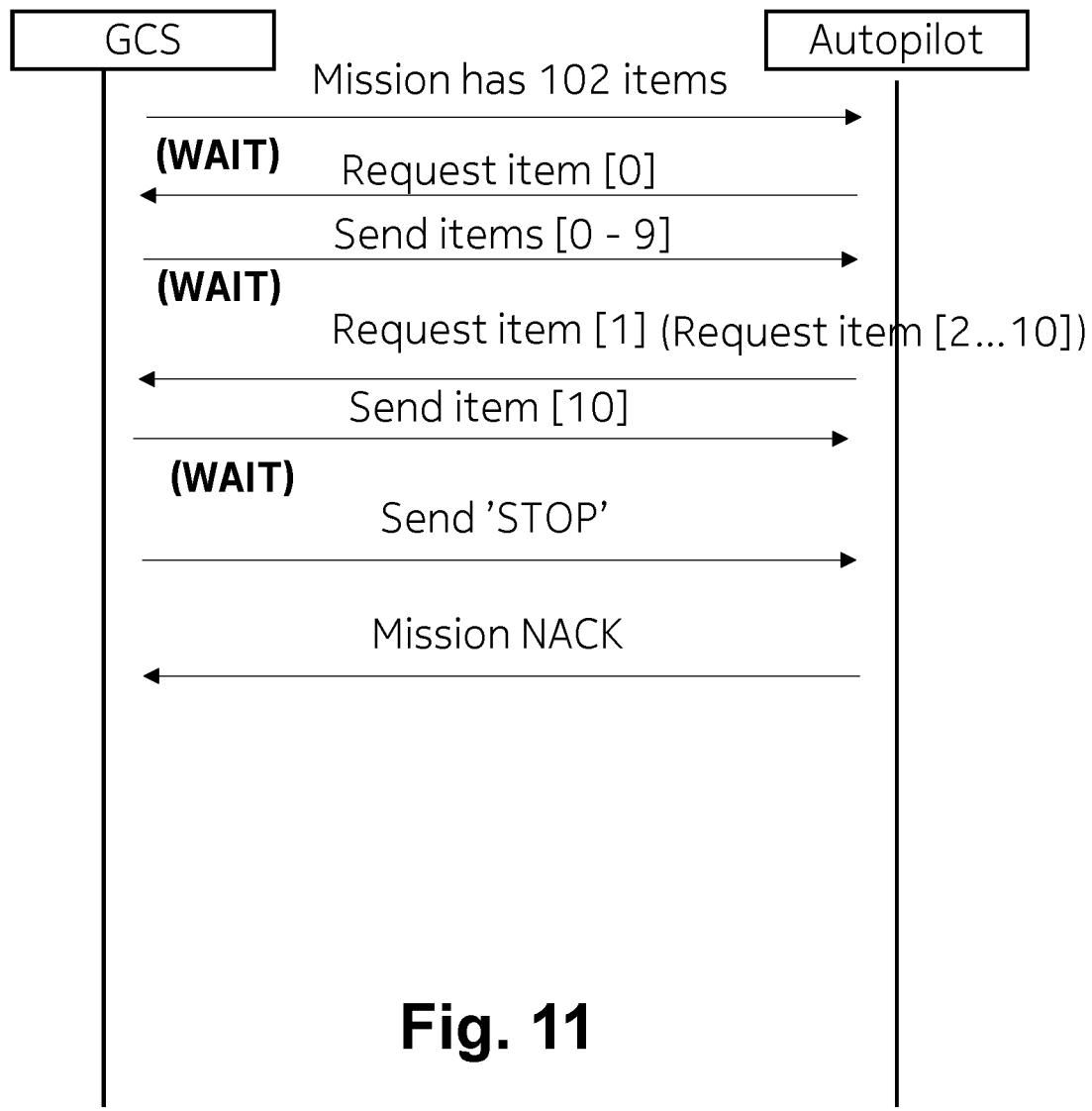
FIG. 11 is a signalling flowchart for another example.

FIG. 11 shows yet another example where a ground control station sends a 'STOP' command (at any point) during transaction. This may be done, e.g., because of a new mission. The autopilot can then send a 'cancelled' acknowledgement (MISSION NACK). Stop command can be sent substantially immediately whenever needed while the request response communication continues in the background. An overriding emergency stop mechanism can be, in practise, rarely needed but may be required for example because of local laws and rules.

The UAV can be stopped at the beginning or during mission data upload, unless it has not already been stopped. The stop command may be, e.g., a similar UDP packet as the other messages. A stop packet may be assigned a priority. The stop packet can be sent at the same time with ongoing request-response packets.

FIG. 11 also illustrates the above mentioned possibility of the autopilot requesting for each of the mission data items [2 . . . 10] while the ground control station is on wait state after having already sent items [0-9]. The GCS ignores these requests and sends mission data item [10] not sent previously.

Request for instruction data items can be sent periodically and/or in response to detection that there are no instruction data items left to read. The requesting operation can be started in response to a task or mission start indication, for example in response to receipt of a mission count message at 61. If the operation is cancelled by either end, the requesting process can also be stopped.

Figure 12:
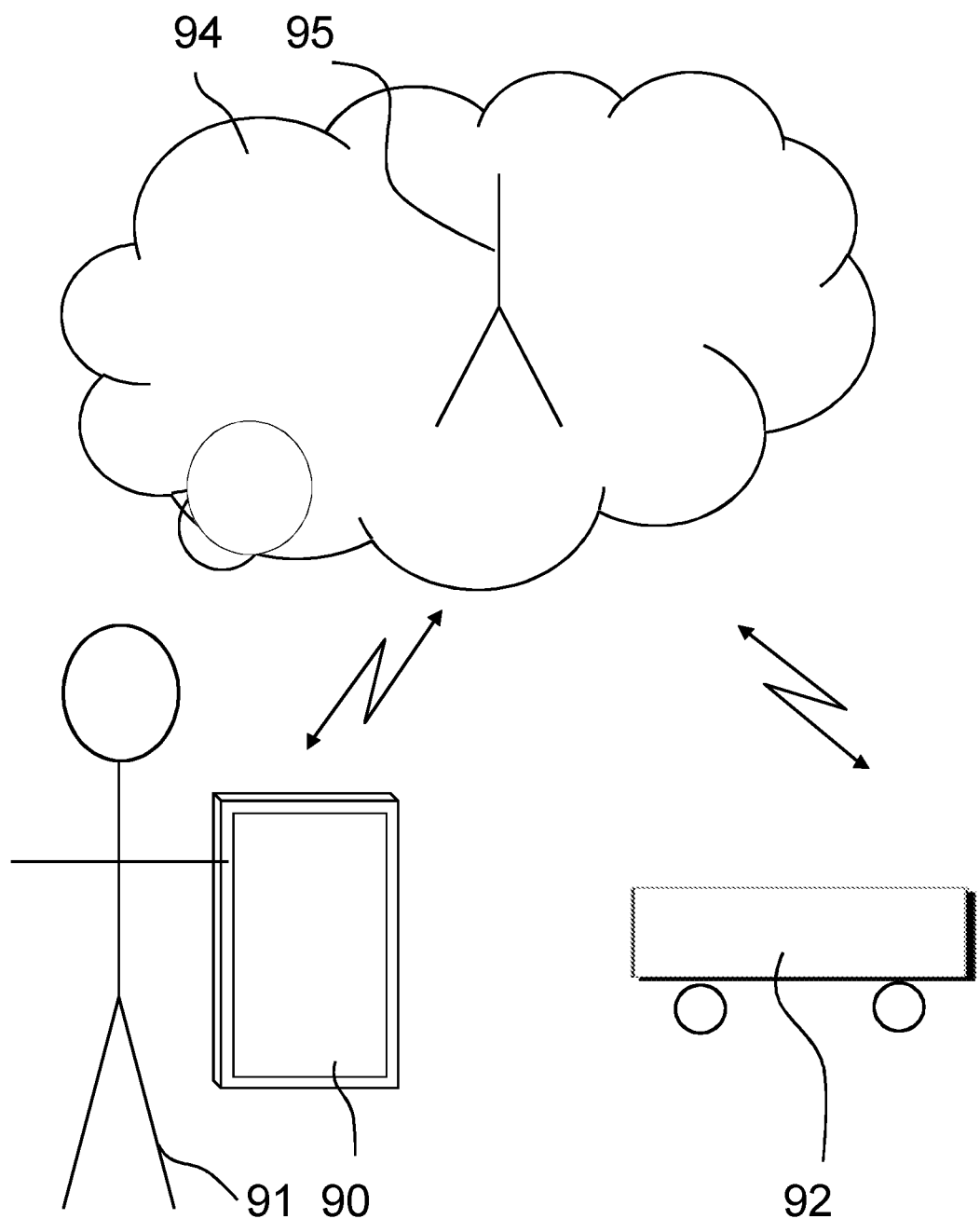
FIG. 12 shows a further example.

FIG. 12 shows an example where remote control apparatus is provided by a mobile communication device, for example a handheld user device 90 of a user 91. The mobile communication device can be a for example a smart phone, tablet or laptop computer or the like device. The mobile communication device 90 can be configured for wireless data communications. The mobile communication device can be adapted for communication, for example, based on 4G and/or 5G, new radio technologies or similar technologies. In FIG. 12 a communication system comprising at least one base station 95 is depicted by the cloud 94. The communication system can be a wireless local area system or a wide area system such as a cellular communication system.

An unmanned land vehicle 92 is also shown as being configured for communication with the communication system 94. The unmanned vehicle 92 can comprise a data processing apparatus as shown e.g. in FIG. 2.

The wireless user device 90 can be provided with an application configured to provide the above described control and messaging functions. The application can be downloaded from a service provider.

Instead of, or in addition to, communications via the communications system 94 and base station 95, the mobile user device 90 and the unmanned vehicle may be configured to establish a direct communication link there between. Indeed, the above discussed functions and features are not limited to any particular communication environment, but may occur in any appropriate communication system where messages can be exchange between a remote control apparatus and an unmanned device configured to receive instructions from the control apparatus.

The controlled device requesting for instruction data items may also comprise a control apparatus and/or a device controlled by such apparatus. Such control apparatus may comprise, for example, a processor apparatus configured to provide a device operating as an Internet of Things (IoT) type device. An Internet of things (IoT) type device can be seen as a one off device or a network of devices such as one or more vehicles, home appliances, industrial devices etc. that contain electronics, software, actuators, and connectivity which allows these devices to connect, interact and exchange data. The IoT can involve extending connectivity to any range of traditionally dumb or non-internet-enabled physical devices and everyday objects. Embedded with technology, these devices can communicate and interact over the Internet, and they can be remotely monitored and controlled. Instruction data item may be sent in, e.g., when there is a need for repair, maintenance or update of the software of such control apparatus. An example of device s operable in IoT environment is "wearable device". These are a member of a class of electronic devices that can be worn on the body as an accessory or an implant, such as smart watches, fitness devices, so-called fashion electronics, and medical devices such as hearing aids, etc. IoT devices and associated controllers can be configured to operate according to the above described principles of request-response communication of control instructions. For example, in the detailed examples given in relation to an autopilot and control station the autopilot can be replaced by an IoT device and the control station by a control apparatus.

The control apparatuses described herein can comprise appropriate circuitry. As used in this specification, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Unmanned vehicles may form a swarm. One of such unmanned vehicles may be configured to act as the leader of the swarm.

A further aspect can be provided in relation to swarms and collision avoidance mechanisms for unmanned vehicles acting as part of a swarm of unmanned vehicles. The control apparatus can activate such a mechanism and/or be informed whenever a collision avoidance mechanism is activated. The response messages according to the herein described principles can be generated taking information of collision avoidance mechanisms into account.

In accordance with a mechanism an unmanned vehicle in a swarm can be arranged to determine whether the unmanned vehicle is being operated in an auto-flight mode or a manual flight mode. The unmanned vehicle can be arranged to set a first volume surrounding the unmanned vehicle in dependence on the determined flight mode. The first volume may have a first size and a first shape. The first size and shape may be set based on the context of the unmanned vehicle. For example, the context may comprise at least one of the location of the unmanned vehicle, the altitude of the unmanned vehicle (if an UAV), the heading/velocity of the unmanned vehicle, and a flight mode of the unmanned vehicle (e.g. whether the unmanned aerial vehicle is operating in an automatic/autopilot mode, or whether the unmanned vehicle is operating in a manual mode). Thus, for example, the size of the first volume may increase with increasing speeds of the unmanned vehicle. The first volume may wholly or only partially surround the unmanned vehicle. The unmanned vehicle can be arranged to monitor the first volume to determine whether or not an object enters the first volume. If an object enters the first volume, the unmanned vehicle is arranged to execute at least one first collision avoidance mechanism for avoiding collision with the object. If no object enters the first volume, the unmanned vehicle continues to monitor the first volume (i.e. the unmanned vehicle does not execute that at least one first collision avoidance mechanism).

In some swarm systems, an unmanned vehicle is configured to define a three dimensional safety boundary. If an object enters this safety boundary, then collision avoidance mechanisms may be executed to avoid this. Collision avoidance mechanisms may involve at least one of a deviation in translational motion or rotational orientation from the navigational course that was configured substantially immediately prior to detection of the object.

As a further example, the unmanned vehicle may be arranged to set two volumes to monitor, one of the volumes being smaller than the other volume (and preferable being wholly enclosed by the other volume). This second (smaller) volume may be treated as a failsafe mechanism, such that at least one collision avoidance mechanism is executed automatically in response to detection of an object within the smaller volume. The failsafe mechanism may operate regardless of whether the unmanned vehicle is operating in a manual mode (e.g. under direct, real-time operator control) or in an autopilot mode. Thus, the unmanned vehicle may be arranged to set a second volume surrounding the unmanned vehicle in dependence on the determined flight mode, the second volume being smaller than the first volume. The second volume may have a second size and a second shape. The second size and the second shape may be determined/selected in dependence on the context of the unmanned vehicle. Subsequent to setting the second volume, the unmanned vehicle may be arranged to monitor second volume to determine whether or not the object enters the second volume. If an object enters the second volume, the unmanned vehicle may be arranged to execute at least one second collision avoidance mechanism for avoiding collision with the object.

A second collision avoidance mechanism may be different to the first collision avoidance mechanism. For example, the first collision avoidance mechanism may depend on notifying an operator of the system of the detected object and waiting from an explicit instruction from the operator for how to avoid the detected object. In contrast, the second collision avoidance mechanism may be an automatic action that does not depend on notifying a control station of the detected object. Therefore, the first collision avoidance mechanism may comprise notifying a control station of the unmanned vehicle of the object entering the first volume, and receiving explicit instructions instructing the unmanned vehicle how to avoid colliding with the object. The second collision avoidance mechanism may comprise automatically moving to avoid colliding with the object without any instructions to do so.

All of the above-mentioned aspects may be implemented in the same system.

It is noted that although FIG. 1 depicts an unmanned aerial vehicle comprising rotors, other types of UAV are possible and the principles are also applicable to systems not needing to comprise any rotors. For example, an unmanned vehicle may be a lighter-than-air gas balloon with thrusters, a miniature aircraft, miniature helicopter or even a full-sized light aircraft.

The required data processing apparatus and functions may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASystem InformationC), gate level circuits and processors based on multi core processor architecture, as non-limiting examples. The data processing may be distributed across several data processing modules. A data processor may be provided by means of, for example, at least one chip. Appropriate memory capacity can be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory. One or more of the steps discussed in relation to the flow and signaling charts may be performed by one or more processors in conjunction with one or more memories.

An appropriately adapted computer program code product or products may be used for implementing the embodiments, when loaded or otherwise provided on an appropriate data processing apparatus. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

A control apparatus for controlling a device may comprise means for receiving a request for at least one instruction data item from the device and means for sending a response message to the request, the sending comprising selectively including at least one instruction data item in the response message based at least partly on determination whether the requested at least one data item has been sent before.

Means for selectively including, in response to a request for a single instruction data item, either a single instruction data item or multiple instruction data items in the response message may be provided.

Means for dynamically adjusting the number of instructions data items in the response message may also be provided.

Means for including in the response message at least one instruction data item that was not requested by the request may be provided.

Means for responding the request by including multiple instruction data items in the response message may be provided. The number of instruction data items included in the response message may be greater than the number of data items indicated by the request.

Means may be provided for including a single instruction data item in the response message in response to determining that the request concerns an instruction data item that has already been sent to the device, and including multiple instruction data items in the response message in response to determining that the request concerns an instruction data item that has not yet been sent to the device.

A control apparatus for a device may comprise means for sending to a remote control apparatus a request for at least one instruction data item and means for receiving, from the remote control apparatus, a response message comprising one or more instruction data items. The number of the instruction data items can have been selected based at least partly on determination whether the requested at least one data item has been sent before to the device. The control apparatus can further comprise means for controlling operation of the device based on the received one or more instruction data items in the response message.

Means for processing at least one instruction data item on the response message that was not requested by the request can be provided.

According to a possibility a control apparatus for a device comprises means for receiving a first response message from a control station includes multiple instruction data items. Means for controlling are configured to substantially immediately use an instruction data item of the received multiple instruction data items for control of the device and save the other instruction data items of the multiple instruction data items in a memory of the device. Means for sending are configured for sending, in response to a failure to obtain one of the saved instruction data items from the memory, a second request for said non-obtained instruction data item. Means for receiving are configured to receive a second response message including at least one instruction data item, wherein the at least one instruction data item is different from the instruction data item requested by the second request. The means for controlling can be configured to continue control of operation of the device based on the received at least one instruction data item.

Sending of multiple instruction data items in a single response message when uploading a mission can be used to reduce latency and/or signalling overhead compared to, e.g., communications according to the Mavlink protocol where the recipient device needs to send a request for each individual mission item as the per request delivery mechanisms can cause the transaction of obtaining a mission item to take unnecessarily long time due to latency in communications. It is also possible to selectively adjust the number of data instruction items in a message responding a request for a single item.

It is noted that whilst embodiments have been described in relation to certain architectures, similar principles can be applied to other systems. Therefore, although certain embodiments were described above by way of example with reference to certain exemplifying architectures for wireless networks, technologies standards, and protocols, the herein described features may be applied to any other suitable forms of systems, architectures and devices than those illustrated and described in detail in the above examples. It is also noted that different combinations of different embodiments are possible. It is also noted herein that while the above describes exemplifying embodiments, there are several variations and modifications which may be made to the disclosed solution without departing from the spirit and scope of the present invention.

The invention claimed is:

1. A method of communicating instruction data items from a control apparatus, comprising:
   receiving a message from a device,
   determining a type of message, comprising a request or an acknowledgment, received from the device,
   determining, depending on the type of message, whether the device has items left taking into account a time for processing of sent data item(s) in the device, and
   sending, responsive to the type of message comprising the request, a response message to the request, the sending comprising selectively including at least one instruction data item in the response message based at least partly on the determinations of:
   the type of message received from the device, and
   the time for the processing of the sent data item(s) in the device.

2. A method according to claim 1, further comprising:
   including a single instruction data item in the response message in response to determining that the request concerns an instruction data item that has already been sent to the device, or
   including multiple instruction data items in the response message in response to determining that the request concerns an instruction data item that has not yet been sent to the device.

3. A method according to claim 1, further comprising:
   determining whether the response message has been sent, and
   if not,
   implying that the request is made because a buffer at the device thereof is empty, and
   sending the response message carrying next multiple data items.

4. A method according to claim 2, wherein the one or more instruction data items comprise a number of data items greater than a number of data items indicated by the request.

5. A method of obtaining instruction data items at a device, comprising:
   sending a message from a device to a control apparatus,
   receiving a response message to the sending of the message, the response message comprising at least one instruction data item based at least partly on one of the determinations of:
   a type of message sent to the control apparatus, or
   a time for processing the received data item(s) in the device,
   sending, in response to a failure to obtain one of the instruction data item(s) saved by a memory, a second request for said instruction data item that was not obtained,
   receiving a second response message including at least one instruction data item, wherein the at least one instruction data item of the second response message is different from the at least one instruction data item of the response message, and
   continuing operation of the device based on the at least one instruction data item of the second response message.

6. A method according to claim 5, wherein the response message received in response to the message includes multiple instruction data items, and wherein the method further comprises:
   using an instruction data item of the received multiple instruction data items for control of the device; and
   saving the other instruction data items of the multiple instruction data items in a memory of the device.

7. A method according to claim 5, wherein the device comprises one of:
   an unmanned aerial vehicle,
   an unmanned land vehicle,
   an unmanned watercraft,
   an unmanned control apparatus,
   an unmanned machine, or
   a device operated in an Internet of things environment.

8. An apparatus comprising:
   at least one processor; and
   at least one memory including computer program code, the at least one memory and the computer program code configured to, with the at least one processor, cause the apparatus at least to perform:
   send a message from a device to a control apparatus, the message comprising a request for at least one instruction data item,
   receive a response message from the control apparatus, the response message comprising one or more instruction data items, wherein a number of the one or more instruction data items has been selected based at least partly on a determination of whether the requested at least one data item has been previously sent to the device, and
   control operation of the device based on the received one or more instruction data items of the response message.

9. An apparatus according to claim 8, wherein the apparatus is further caused to store data item(s) in the at least one memory that were received in the response message, read the data item(s) directly from the at least one memory without needing to request the data item(s) individually, and wait for the response message.

10. An apparatus according to claim 8, wherein the apparatus is further caused to:
    receive a single instruction data item in the response message in response to determining that the message concerns an instruction data item that has already been sent to the device, and
    receive multiple instruction data items in the response message in response to determining that the message concerns an instruction data item that has not yet been sent to the device.

11. An apparatus according to claim 8, wherein the apparatus is further caused to process the at least one instruction data item of the response message that was not requested by the request.

12. An apparatus according to claim 8, wherein the apparatus is further caused to:
   receive the response message by receiving a first response message from the control apparatus including multiple instruction data items,
   control operation of the device by using an instruction data item of the received multiple instruction data items for control of the device and saving the other instruction data items of the multiple instruction data items in the at least one memory of the device, and
   send the request comprising sending the request in response to a failure to obtain one of the saved instruction data items from the at least one memory.

13. An apparatus according to claim 8, wherein the device comprises one of:
   an unmanned aerial vehicle,
   an unmanned land vehicle,
   an unmanned watercraft,
   an unmanned control apparatus,
   an unmanned machine, or
   a device operable in an Internet of things environment.

14. An apparatus according to claim 8, wherein the apparatus is further caused to receive the response message to the message carrying one data item or the response message carrying multiple data items.

15. An apparatus according to claim 14, wherein the message comprises a request or an acknowledgement message.

16. An apparatus according to claim 15, wherein the acknowledgement message comprises:
   at least one of a status information of the at least one instruction data item,
   an indicator of whether a waypoint of the at least one instruction data item is reached by the device,
   an acknowledgement message having acknowledgments of multiple individual data items,
   a successfulness indicator,
   a failure indicator,
   a completeness indicator, or
   an identification of the at least one instruction data item.

17. An apparatus according to claim 14, wherein the apparatus is further caused to
   determine to receive the response message with one instruction data item instead of multiple data items to avoid overflowing the at least one memory at the device.

18. An apparatus according to claim 14, wherein an indication in the response message comprises a number of data items for a mission.

* * * * *